March 17, 1925.
F. BENNER ET AL
1,530,069
PUMP
Filed Nov. 12, 1921
7 Sheets-Sheet 2
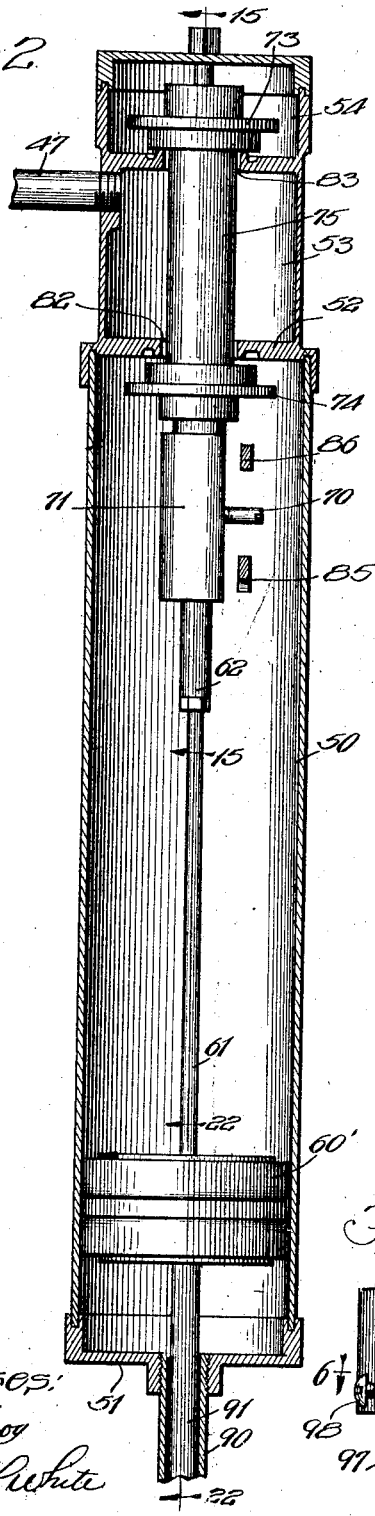
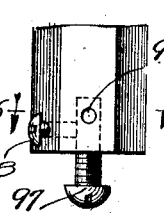

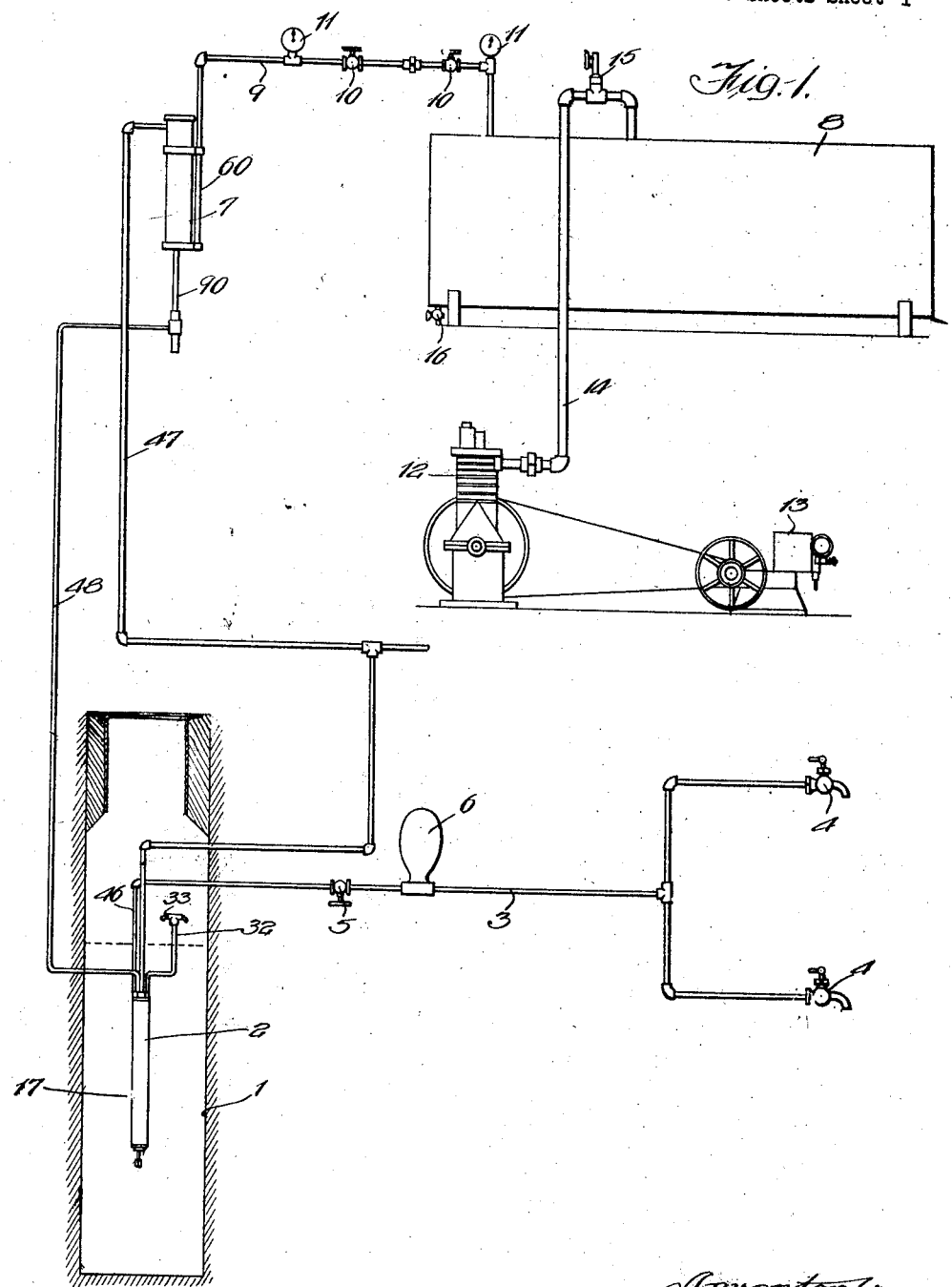

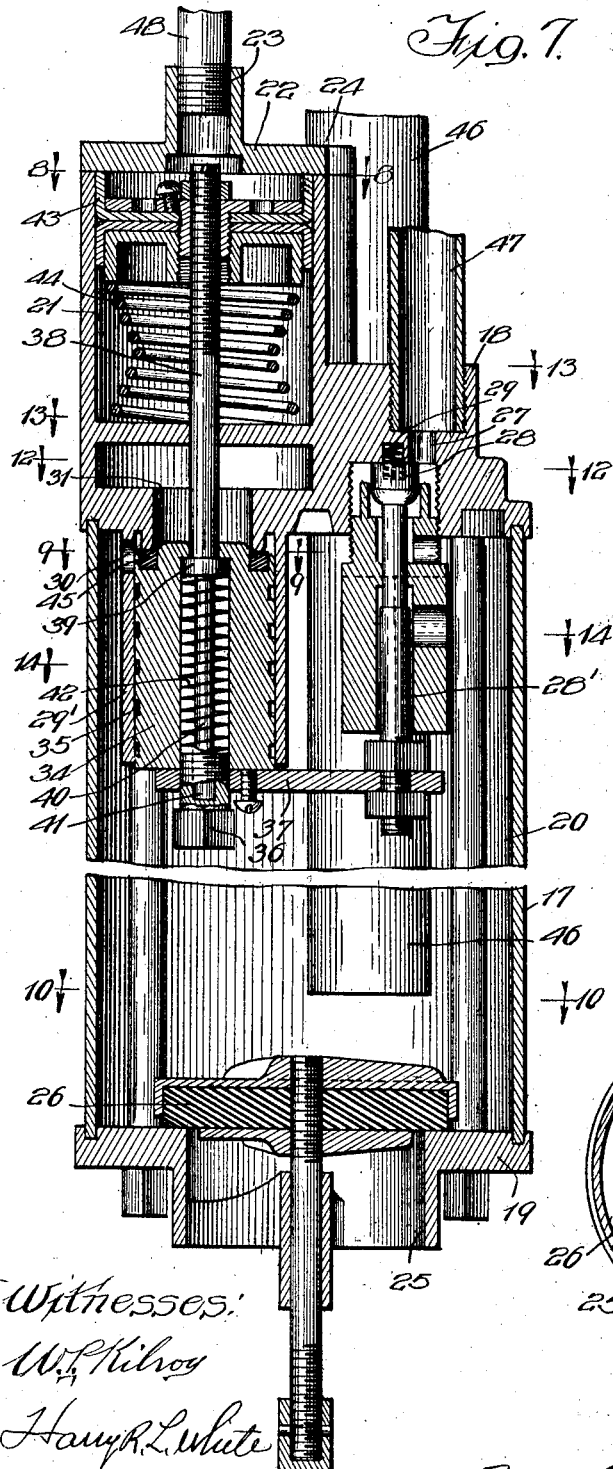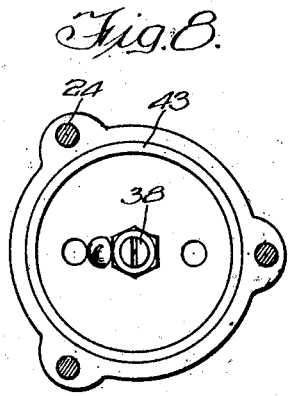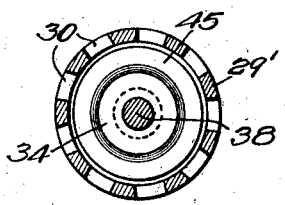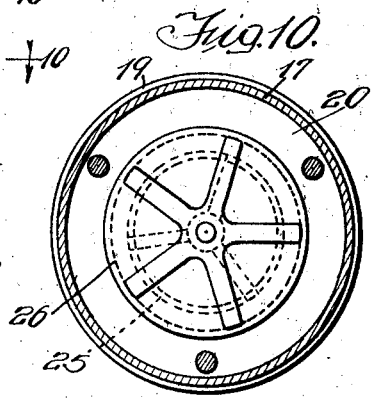

March 17, 1925. 1,530,069
F. BENNER ET AL
PUMP
Filed Nov. 12, 1921 7 Sheets-Sheet 4

Witnesses:
W. F. Kilroy
Harry R. L. White

Inventors:
Forrest Benner
Otto W. Pfau
Richard O. Tischkowski
By Hill & Hill Attys.

March 17, 1925.  1,530,069
F. BENNER ET AL
PUMP
Filed Nov. 12, 1921  7 Sheets-Sheet 5
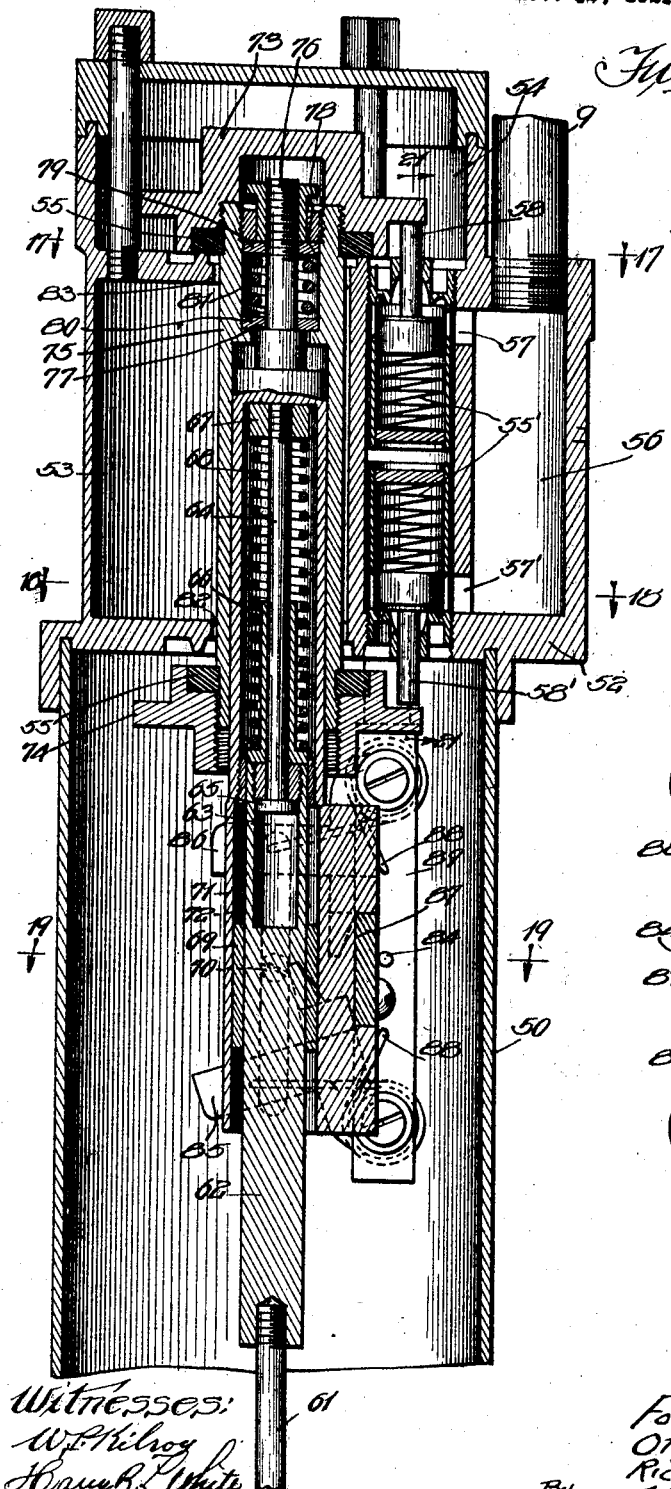

March 17, 1925.
F. BENNER ET AL
1,530,069
PUMP
Filed Nov. 12, 1921    7 Sheets-Sheet 6
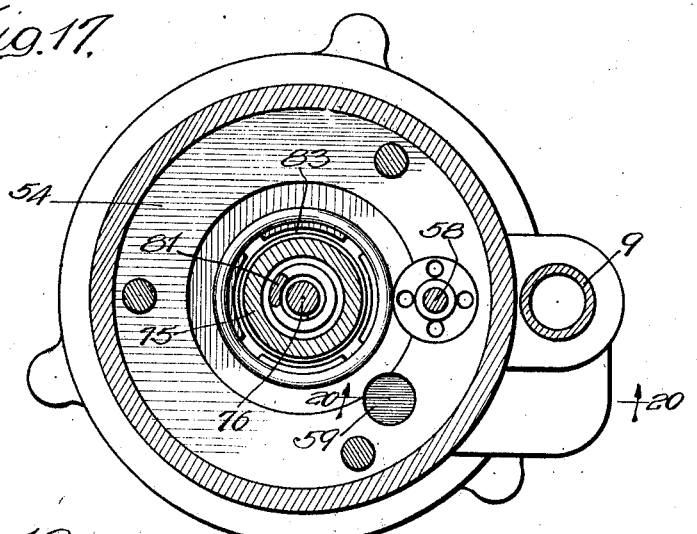
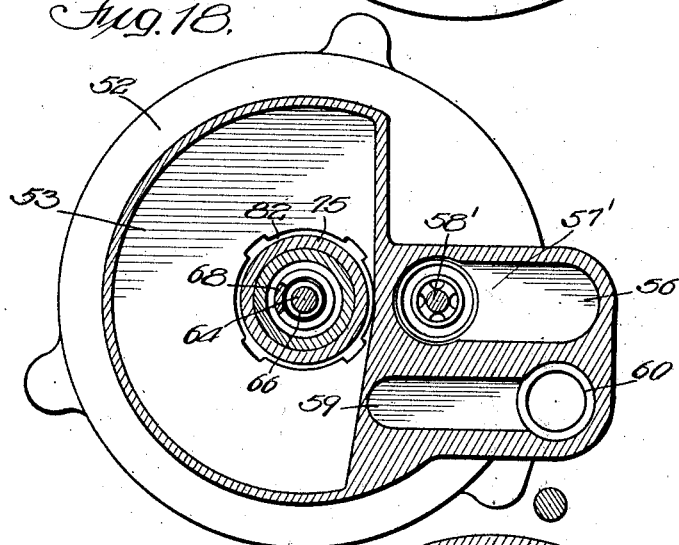
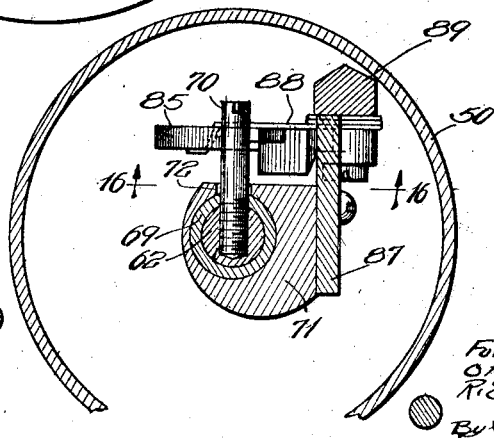

March 17, 1925.

F. BENNER ET AL 1,530,069

PUMP

Filed Nov. 12, 1921  7 Sheets-Sheet 7

Witnesses:
W. F. Kilroy
Harry R. L. White

Inventors:
Forrest Benner
Otto W. Pfau
Richard O. Jischkowski

Patented Mar. 17, 1925.

1,530,069

UNITED STATES PATENT OFFICE.

FORREST BENNER, OTTO W. PFAU, AND RICHARD O. JISCHKOWSKI, OF CHICAGO, ILLINOIS, ASSIGNORS TO MIRIA C. PFAU, OF CHICAGO, ILLINOIS.

PUMP.

Application filed November 12, 1921. Serial No. 514,774.

*To all whom it may concern:*

Be it known that we, FORREST BENNER, OTTO W. PFAU, and RICHARD O. JISCHKOWSKI, residing in Chicago, in the county of Cook and State of Illinois, have invented certain new and useful Improvements in Pumps, of which the following is a specification.

Our invention relates to improvements in pumps, and more particularly to a fluid operated pump which is simple and compact in construction, durable, reliable, efficient and satisfactory for use wherever found applicable.

More especially our invention relates to a pumping apparatus and system wherein, the fluid such as water or the like is pumped direct from the source of supply such as a well, cistern, pond, etc., to the discharge point or points without storage, the pumping being automatically governed by the demand at the discharge point or points.

It has among its further objects the production of an apparatus that will be operative with a minimum of attention and care and without requiring the attention of one skilled in the handling, care and use of the same.

Another object of our invention is to provide a fluid motor in combination with a fluid-operated pump, said motor and pump being operatively connected together so that the motor will transmit a pump-operating fluid thereto, and wherein the operations will automatically cease when the pressure of the motive fluid for operating the pump balances the pressure of the motor-operating fluid.

Many other objects and advantages of the construction herein shown and described will be obvious to those skilled in the art from the disclosures herein given.

To this end our invention consists in the novel construction, arrangement and combination of parts herein shown and described, and more particularly pointed out in the claims.

In the drawings, wherein like reference characters indicate like or corresponding parts, Fig. 1 illustrates diagrammatically an installation of the pump and operating means therefor;

Fig. 2 is a longitudinal section through the fluid operating motor;

Fig. 3 is a sectional detail of the check and bleeder valves;

Fig. 4 is a section taken substantially on the line 4—4 of Fig. 3;

Fig. 5 is a fragmentary detail of the adjustment for the bleeder valve outlet;

Fig 6 is a section taken substantially on the line 6—6 of Fig. 5;

Fig. 7 is a longitudinal sectional view through the pump;

Fig. 8 is a section taken substantially on the line 8—8 of Fig. 7;

Fig. 9 is a section taken substantially on the line 9—9 of Fig. 7;

Fig. 10 is a section taken substantially on the line 10—10 of Fig. 7;

Fig. 15 is a section taken substantially on the line 15—15 of Fig. 2;

Fig. 16 is a detail of the piston rod trips taken on the line 16—16 of Fig. 19;

Fig. 17 is a section taken substantially on the line 17—17 of Fig. 15;

Fig. 18 is a section taken substantially on the line 18—18 of Fig. 15;

Fig. 19 is a section taken substantially on the line 19—19 of Fig. 15.

Figure 11:
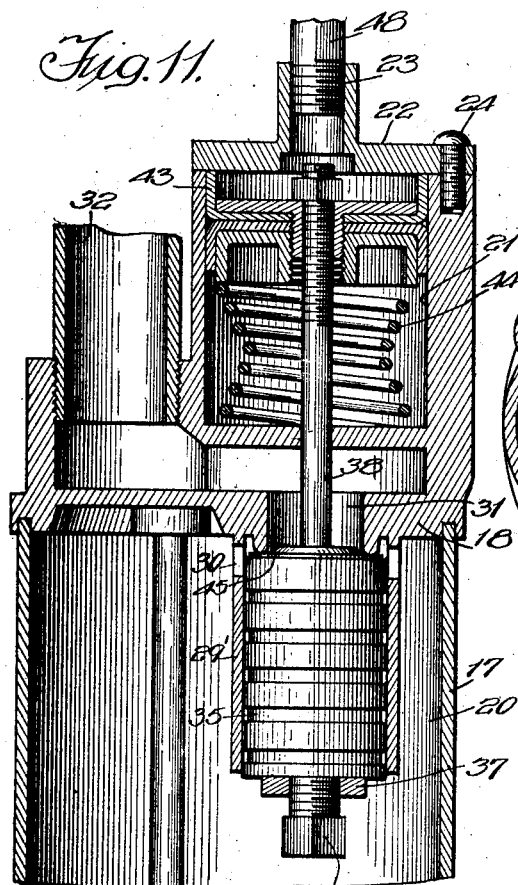
Fig. 11 is a section taken substantially on the line 11—11 of Fig. 13.
Figure 12:
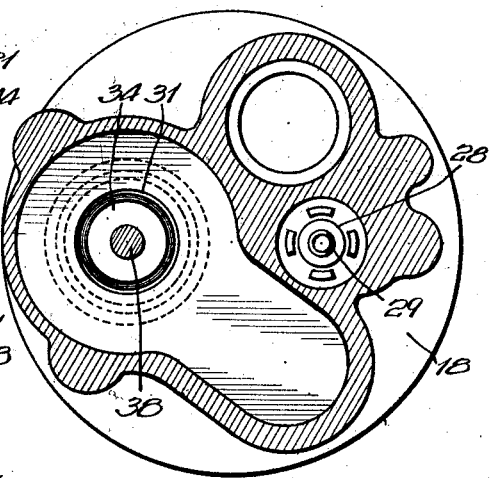
Fig. 12 is a section taken substantially on the line 12—12 of Fig. 7.
Figure 13:
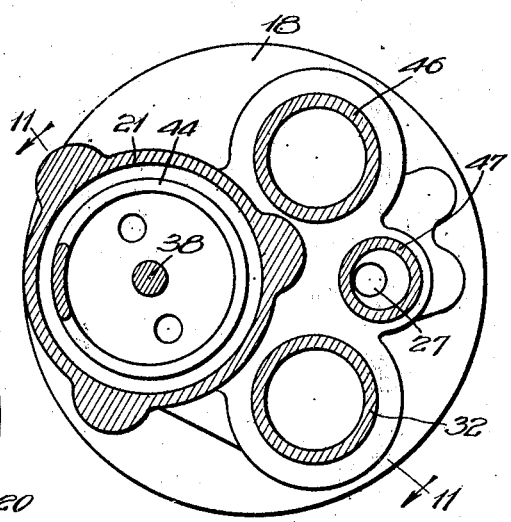
Fig. 13 is a section taken substantially on the line 13—13 of Fig. 7.
Figure 14:
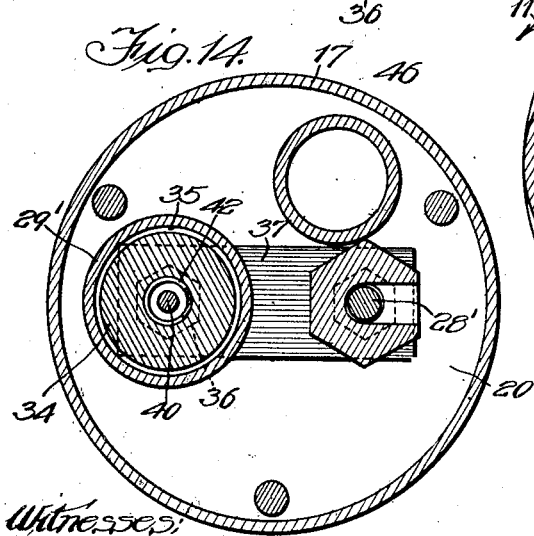
Fig. 14 is a section taken substantially on the line 14—14 of Fig. 7.

In the drawings, wherein we have illustrated a preferred embodiment of our invention, 1 indicates a well, cistern or the like, having water therein which is intended to be conducted to a house, barn or other desired points. A pump 2 is in direct communication with the liquid of the well and has a discharge line 3 leading to one or more faucets 4. A check valve 5 is preferably placed at some suitable point in the line so as to prevent the return of water to the pump, and an air chamber 6 is also arranged between the check valve and the faucets so that the flow of water discharged at the faucets will not be pulsating, but will flow steadily.

A motor 7 is arranged at any suitable point, near or distant, relative to the pump, and operatively connected thereto so as to drive said pump, said motor being fluid-operated and driven by compressed air or the like from a storage tank 8, of the desired size and shape and connected to said storage tank by an inlet pipe 9. One or more pressure controlling or reducing and check valves 10 preferably are arranged between said tank and motor, and there are one or more pressure indicating gages 11 so that the pressure at various points in the line may be ascertained.

An air compressor 12, driven by a gasoline engine 13, electric motor or other source of power has a pipe 14 leading to said tank, there being a safety or blow off valve 15 intermediate said compressor and tank. A drain valve 16 is arranged adjacent the bottom of the tank for the purpose of exhausting air therefrom and removing any sediment from within the tank.

The pump 2 (see Figs. 7 and 11) is fluid-operated or controlled and comprises a casing 17 having top and bottom cover plates or walls 18 and 19 respectively so as to form a main chamber 20, the top cover 18 being chambered to provide a casing having an auxiliary chamber 21 independent of said main chamber and other chambers and ducts hereinafter referred to.

A cover plate 22, having a central aperture 23, is detachably secured to said casing so as to close the auxiliary chamber 21, by means of screws 24, or other suitable or equivalent means. The bottom wall member 19 is apertured in direct communication with the liquid in the well, and to provide an intake 25, an intake valve 26 slidably movable thereat being arranged to control the admission of liquid through said intake into said main chamber 20. An air inlet port 27 is provided at the top cover 18 and communicates with the main air chamber 20. An inlet valve 28 is positioned at said inlet port so as to control the passage of fluid through the port and admission of air into said chamber.

Between said inlet valve and cover plate 18 is a spring 29 resiliently urging the closure of said air inlet opening. Depending from the cover plate 18 and extending into the chamber 20 is a sleeve 29' having ports 30 through the wall thereof adjacent the upper end, said ports communicating with a discharge or exhaust outlet 31. An air discharge pipe 32 communicates with said exhaust outlet 31 at one end, and has its other end 33 above the level of the water in the well, as shown in Fig. 1. A valve 34 is slidably arranged within the sleeve 29 to control the discharge of air through the exhaust outlet 31, said valve being annularly grooved as at 35 for rings or packing material to provide a seal between the valve and sleeve. At the upper face of the valve 34, there is formed an annular recess for receiving a packing ring 45 of rubber or other suitable resilient, compressible material and adapted to bear against the lower end of the opening 31. The valve 34 is axially bored and at the lower end receives a setscrew 36 said setscrew being adjustable relative to said valve and having a bore or recess 41 therein, open only at one end of the screw. An arm 37 extends laterally therefrom and is adjustably connected to the valve stem push rod 28', whereby both the valves 28 and 34 may be moved in unison (see Fig. 7). A stem 38, having an enlarged collar 39, is slidable within the axial bore through the valve 34 and is prevented from accidental disengagement therefrom by means of said collar 39. The lower portion 40, of said stem arranged within the bore of the valve 34, is adapted to abut against the screw 36 in the recess 41 just before the limit of its downward movement.

We have shown a spring 42 arranged between the screw 36 and the collar 39, the spring being slightly depressed during the downward movement of the stem so that when the end 40 engaging with the screw 36 at the bottom of the recess 41 moves the valve 34 towards its open position, the spring will immediately snap the parts to wide open position and maintain the same open until the collar 39 engages the end of the plunger, positively moving it to its closed position. At the upper end of the stem 38 is arranged a piston 43, which is slidable in said auxiliary chamber 21 and is controlled by the fluid in the chamber at the inlet opening 23, a coiled spring 44 or the equivalent is positioned behind said piston so as to return said piston to its normal position, substantially as shown in Fig. 7, when the air pressure upon the opposite face of said piston has been released.

A water discharge pipe or main 46 is extended through the cover 18, the lower or intake end of the main being at a slight distance above the intake valve 26, but not interfering with its freedom of movement. Communicating with the inlet 27 is the air pressure line 47, and leading to the auxiliary inlet 23 is the air pressure line 48, both said air lines communicating with the air motor 7.

The operation of the pump is as follows: Assuming that the intake 25 is open, the chamber 20 having water therein, then if air under pressure is admitted through the pipe 47 through the inlet 27 it will exert a force upon the water to immediately close the intake valve 26, and force the water up through the water main 46, so that it may be discharged at the faucets 4. When the water in the chamber 20 has been substantially emptied therefrom, air under pressure is admitted from the air motor through the pipe 48 and into the auxiliary chamber 21, moving the piston 43 against the spring tension 44 the movement of the piston serving to actuate the valve 34 the pressure of the spring 42 to open the ports 30 and 31 to the chamber 20. It will be seen that as the valves 28 and 34 are rigidly connected, when one of them is opened, the other will be closed. Therefore, when the piston 43 opens the exhaust ports 30 and 31 it will close the air passage through the air inlet port 27, whereby the air within the chamber may be exhausted through said exhaust port permitting the water in the well or cistern under atmospheric pressure to lift the intake valve 26 and fill the chamber 20. Substantially expelling all the air through the exhaust.

Means, which will be hereinafter described, are provided to communicate with the pipe 48, whereby the air that is admitted through the pipe 48 has but a momentary piston-driving effect, so that it will drive the piston 43 to open the exhaust valve which opens with a snap action, but as the air pressure in the line 48 is suddenly terminated, the piston 43 will be moved to its normal position by the spring 44, as shown in Fig. 7, thus serving to close the exhaust ports. At the same time air from pipe 47 is again admitted forcing the water out through pipe 46, the action being repeated as described.

Figure 20:
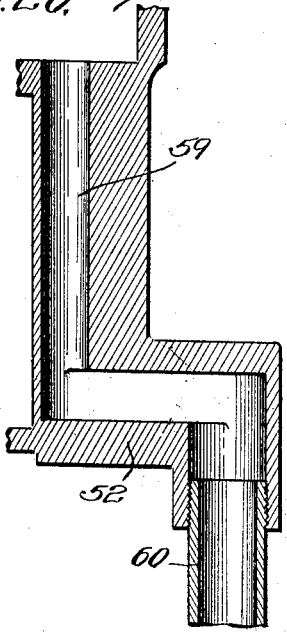
Fig. 20 is a sectional detail of a portion of the fluid inlet means of the motor.
Figure 21:
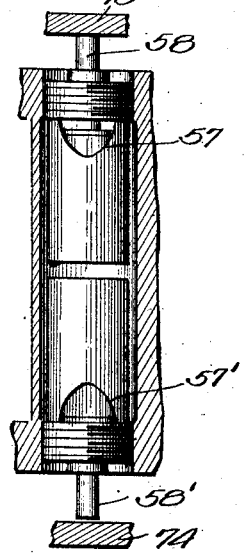
Fig. 21 is a section taken substantially on the line 21—21 of Fig. 15.
Figure 22:
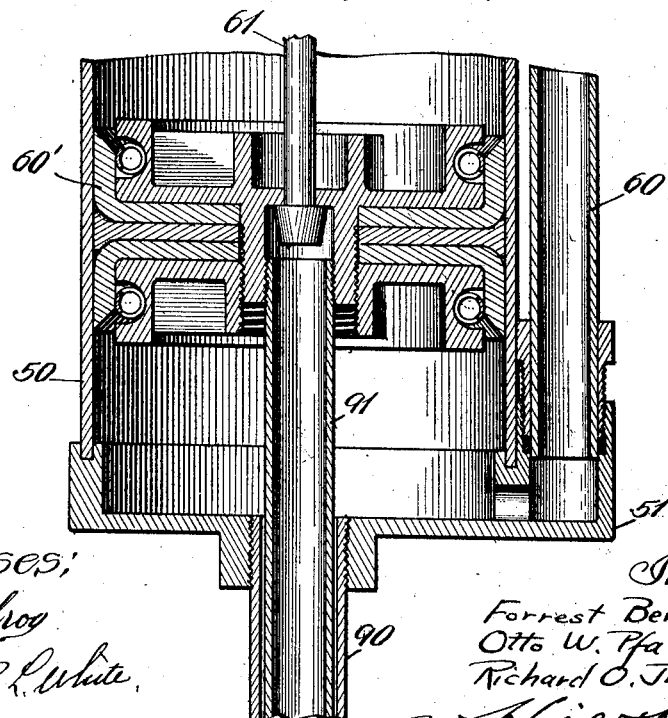
Fig. 22 is a section taken substantially on the line 22—22 of Fig. 2.

The motor 7 comprises a hollow casing or cylinder 50, with a lower or bottom cover plate 51, and a top cover plate 52, said top plate having a pair of chambers 53 and 54 therein. The pipe 9 from the tank 8 leads to an inlet chamber 56 adjacent the chamber 53 but not in direct communication therewith. The inner wall of the chamber 56 has a pair of inlet ports 57, 57', therein, communicating with the valve chamber and there are a pair of valves 58 and 58' controlling said ports 57 and 57' respectively, the valve 58 permitting the fluid admitted into the inlet 56 to be passed through the valve chamber into the chamber 54, while the valve 58' controls the passage of air from the inlet chamber 56 through the port 57' and into the upper end of the casing 50. The air admitted past the valve 58 into the chamber 54 will flow through a duct 59, as shown more clearly in Fig. 20, and thence flow exteriorly of the casing 50 through a pipe 60, which, as shown in Fig. 22, leads directly into the lower end of the hollow casing. A piston 60' is arranged within said casing or cylinder so as to be reciprocatory therein, said piston having a piston rod 61 movable relative to the piston in one direction of movement (downwardly, as shown in Fig. 22), and comprising several telescopically connected sections so that the piston might be termed a "floating" piston. The telescopic sections of the piston rod comprise the part 61, to which is detachably connected a rod portion 62 of large diameter said portion 62 having an axial recess 63 in the upper end thereof, and into this recess 63 is arranged another section 64 of the piston rod, the part 64 telescoping into the recess 63. An enlarged head 65 is arranged on the lower end of the section 64 of the piston rod, whereby the expansion or separation of the sections are limited in one direction of movement. A sleeve 66 encircles the rod section 64, and bears against its upper end and a nut 67 is arranged at the opposite end of the section 64, there being a spring 68 between the sleeve and nut, whereby the contraction of the telescopic sections 62 and 64 of the piston rod are yieldably resisted. A bushing 69 is fixedly arranged on the enlarged piston rod section 62, and an offset pin 70 projects laterally therefrom. Surrounding the bushing 69 and slidable relative thereto is a sleeve 71 having a longitudinal slot 72 therein, through which the pin 70 projects to prevent any relative rotation of movement between the sleeve and the piston rod. A pair of discharge valves 73 and 74 are rigidly connected together by a tube 75, said tube encircling the sleeve 71. The upper end of the sleeve 71 is reduced in diameter, as at 76, and has a pair of annular shoulders or collars 77 and 78 axially spaced thereon, the upper collar 78 being preferably adjustable on the portion 76. Engageable with said shoulders 77 and 78 are washers 79 and 80 slidably arranged within the tubular part 75 and having a spring 81 between said washers, whereby the sleeve 71 may be moved a slight distance, relatively to the tubular portion 75, against the pressure of the spring 81 without straining any of the abutting parts.

Discharge ports 82 and 83 are arranged so as to communicate with the chamber 53, both of said discharge ports communicating with the piston chamber, one of said discharge ports 82 arranged in the wall 52 between the piston chamber and the chamber 53, and encircling the tube 75, and the other discharge port 83 arranged between the chambers 53 and 54 and coaxial with and encircling the tube 75. The discharge valves 73 and 74 are arranged so as to overlie the inlet valves 58 and 58' so as to be engageable therewith when the discharge valves are moved, one of said ports being open whenever the other is closed. Packing rings 55 are arranged at the oppositely facing ends of the valves 73 and 74 so as to bear against the openings 82 and 83 said packing rings being preferably of rubber or other suitable resilient or compressible material.

In the operation of the motor, air under pressure is admitted through the pipe 9 into the inlet chamber 56, and, assuming that the inlet valve 58 is open, as shown in Fig. 15, and the inlet valve 58' closed, then the air will pass through the port 57 into the chamber 54 and downwardly through the ducts 59 and 60 to the underside of the piston, driving the piston upwardly at first, relatively to the piston rod, and then with the rod, so that the driven fluid on the upper side of the piston is discharged through the discharge port 82 into the chamber 53 and outwardly through the pipe 47, communicating with the pump inlet. At substantially the end of stroke the valve 58 is closed and valve 58' opened. For the opposite stroke of the piston, the air coming through the pipe 9 and into the chamber 56 will be admitted through the port 57' past the valve 58', the valve 58 being closed, and drive the piston downwardly in the cylinder, relatively to the piston rod at first and then together with said piston rod so that the air on the lower side of the piston is driven upwardly in the pipe 60 and the duct 59 into the chamber 54, where it passes through the discharge port 83 into the chamber 53 and passes downwardly in the pipe 47 to the pump air inlet.

In order to operate the discharge valves 73 and 74 quickly, or with a snap action so as to prevent a wire-drawing action at said valves, there are a pair of trips 85 and 86 positioned in the path of movement of the pin 70, the trips 85 and 86 being spaced apart axially of the piston rod and fixedly held in place by a rod 89 secured to the wall 52. Springs 88 are arranged at said trips to yieldably resist the movement of the pin 70 and the piston rod, as said pin and piston rod are driven by the piston. A lug 87 is arranged on the sleeve 71 laterally thereof and of a greater axial length than the distance apart of said trips so as to be engageable with said trips alternately to normally hold the sleeve against movement relative thereto. A screw 84 is arranged upon the trip support 89 and is engageable with the lug 87 to prevent the rotation of the sleeve 71 but permit said sleeve to be moved axially.

Upon the upward movement of the piston, the piston rod sections are telescopically contracted in length against the tension of the spring 68, and with the sleeve 71 normally held fixed by the trip 86, the pin 70 is moved by the rod 62 until it engages against the trip 86 at substantially the end of its travel, the trip yieldably retarding the movement of the piston rod, but finally being released from its engagement with the lug by the pin 70, whereby the spring throws the sleeve 71 forwardly in the direction of movement of the piston rod to simultaneously close the valve 74 and open the valve 73. When the lug is moved upwardly the upper trip frees itself of said lug and the lower trip 85 moves into engagement therewith to yieldably resist the downward movement of the sleeve and piston rod.

Upon the return or downward stroke the trip 85 is released in the same manner as just described in connection with the upstroke, snapping the sleeve 71 downwardly to snap the upper valve 73 to close the port 83 and simultaneously open the port 82. It will be noted that the valves 73 and 74 are engageable with and operate the inlet valves 58 and 58', as shown in Fig. 15, and that springs 55 are arranged to actuate the valves 58 and 58' to close the inlet ports, when the valves 73 and 74 are released therefrom.

At the lower end of the cylinder is a pipe 90, and into said pipe 90 is adapted to slide an auxiliary stem 91, closed at its lower end and connected to the under side of the piston, as shown in Fig. 2, there being play, or clearance, between said tubular stem and the pipe 91 and 90 respectively, the stem 91 also serving to slidably receive the piston rod section 61, as shown in Fig. 22.

A check valve 92 is positioned at the lower end of the pipe 90, and is engageable with the stem 91 at the lower limit of travel of said stem, said check valve controlling a valve chamber 93 (see Fig. 3) communicating with the pipe 48, which, as has been previously described, leads to the auxiliary piston chamber 21 of the pump. Depending from the valve 92 in the valve chamber 93 is a stem 94 having a vent 95 therein communicating with a vent 96, at the bottom of the chamber. In order to adjustably control the size of the vent 96, which is in communication with the valve chamber 93 when the check valve 92 is in the position shown in Fig. 3, a pair of setscrews 97 and 98 are adjustably arranged to intersect the bore of said vent. When the valve 92 is opened to permit passage between the pipe 90 and the pipe 48, the vent 96 is shut off from the valve chamber. A spring 99 is arranged in the valve chamber 93 to automatically return the check valve 92 to its normal position after each operation thereof.

Assuming that there is air in the cylinder, on the lower side of the piston 60, then when the piston is driven downwardly, the stem 91 secured thereto will at its limit of downward travel, engage the valve 92, so that a portion of the air before the piston will be driven into said valve chamber 93 and through the pipe 48, the major portion of the air being driven upwardly through the pipe 60. The air driven through the pipe 48 operates to move the piston 43, which in turn opens the exhaust ports 31 and 30 and closes the inlet port 27, whereby the water intake valve 26 is opened or lifted due to the reduced pressure, in the water chamber and permits the water to fill the chamber 20. Meanwhile the piston 60 is moving upwardly, because at the downward limit of piston travel the inlet valve 58' closes and the valve 58 opens, so that the driving air is now coming downwardly in the pipe 60 and the valve 92 has been closed by the pressure of the spring 93, so that the air exhausted from the auxiliary piston chamber 21 will flow upwardly through the pipe 48 and through the communicating air vents or bleeders 95 and 96, the adjustment of the vent 96 determining the duration returning the auxiliary piston to its normal position and consequently the duration of holding open the ports 30 and 31.

It will seem that when the faucets are shut, the main piston will move until the fluid pressure for operating the pump is equal to the fluid pressure for operating the motor, or, in other words, until the fluid pressures on the opposite sides of the piston 60' are balanced, thus serving to automatically control the operation of the motor and consequently of the pump.

Having thus described our invention, it is obvious that various immaterial modifications may be made in the same without departing from the spirit of our invention; hence we do not wish to be understood as limiting ourselves to the exact form, construction, arrangement and combination of parts herein shown and described or uses mentioned.

What I claim as new and desire to secure by Letters Patent is:

1. In a water system of the kind described and in combination, an air motor having an air inlet and an outlet, a piston reciprocatory in said motor, a pair of air intake valves controlling the passage of said air from said inlet to the opposite sides of said piston, a pair of discharge valves rigidly connected together so as to operate in unison and communicating with and controlling said outlet, said intake valves being engageable with and controlled by said discharge valves, and means operatively connecting said piston and discharge valves for operating said valves in a predetermined manner.

2. In a system of the kind described and in combination an air motor having an air inlet and an air outlet, a piston reciprocatory in said motor, a piston rod carried by said piston, a pair of intake valves for controlling the passage of air alternately to opposite sides of said piston, a pair of discharge valves connected together to operate in unison to close one of said discharge valves while opening the other and communicating with said outlet, yieldable means for telescopically connecting said piston rod and said discharge valves so as to resiliently resist the movement of said piston rod, and means for suddenly relieving said resistance substantially at the ends of the piston travel, whereby said piston rod will move relatively to said discharge valves to sharply operate said valves.

3. In a device of the kind described and in combination, a pump having a water chamber therein provided with a discharge outlet leading therefrom, a valve controlling the water intake to said chamber, an air inlet and an air discharge outlet in said chamber, valves controlling said air inlet and air discharge outlet, and air-pressure-controlled means independent of said air inlet for controlling said air inlet and discharge outlet valves.

4. In a device of the kind described and in combination, a pump having a water chamber therein provided with a discharge outlet leading therefrom, a valve controlling the water intake to said chamber, an air inlet and a discharge outlet in said chamber, valves controlling said air inlet and discharge outlet, means for connecting said last-mentioned valves to operate in unison, and air-pressure-controlled means independent of said air inlet and operatively connected to said air outlet valve for controlling said air inlet and discharge outlet valves.

5. In combination with a motor having a main air outlet and an auxiliary air outlet, a pump having a water chamber provided with a water discharge outlet, and an air inlet and outlet therein, a connecting pipe leading from said main air outlet from said motor to said air inlet to the pump, valves controlling said air inlet and discharge outlet in the pump, said valves being rigidly connected together to operate in unison, an air chamber in said pump communicating with said auxiliary air outlet of the motor, and means controlled by the pressure in said auxiliary air chamber for controlling said air intake and discharge valves in said pump.

6. In a system of the kind described and in combination, an air motor having a cylinder with air inlets and outlets therein, a piston reciprocatory in said cylinder, a longitudinally-yieldable, telescopic piston rod connected to said piston, inlet valves controlling said inlets to admit air alternately to opposite sides of said piston, discharge valves controlling the outlets from said cylinder, a sleeve encircling said piston rod and operably carried thereby and slidably connected to said discharge valves, resilient means between said sleeve and discharge valve for limiting the movement therebetween, and yieldable means operatively engageable with said piston rod at a predetermined point of its travel to yieldably resist the movement thereof and to suddenly release said resistance, causing said discharge valves to operate with a snap action.

7. In a system of the kind described and in combination, an air motor having a cylinder with air inlets and outlets therein, a piston reciprocatory in said cylinders a longitudinal-yieldable, telescopic piston connected to said piston, inlet valves controlling said inlets to admit air alternately to opposite sides of said piston, discharge valves controlling the outlets from said cylinder, a sleeve encircling said piston rod and operably carried thereby and slidably connected to said discharge valves, resilient means between said sleeve and discharge valve for limiting the movement therebetween, a fixedly positioned, yieldable trip operatively engageable with said piston rod at a perdetermined point of its travel to yieldably contract said telescopic rod and to suddenly release said resistance, whereby said piston rod may quickly elongate to operate said discharge valves with a snap action.

8. In a system of the kind described and in combination, an air motor having a main air discharge outlet and an auxiliary air outlet, a piston in said motor and controlling both said outlets, a pump having air inlets communicating with both said outlets, an inlet valve operable at and controlling one of said pump inlets, a discharge valve rigidly connected to said inlet valve controlling the discharge of air from said pump, and a valve in said auxiliary discharge outlet of the motor for adjustably controlling the operation of said last mentioned pump valves.

9. In a system of the kind described and in combination, a pump having a main air inlet, an auxiliary air inlet independent of said main inlet, an air outlet and means controlled by the air admitted into said auxiliary inlet for opening and closing the main air inlet and the discharge outlet.

10. In a water system of the kind described and in combination, an air motor having a cylinder therein provided with an inlet and outlet, a piston reciprocatory in said cylinder, means for conducting air under pressure to said inlet, means for admitting said air from said inlet alternately to opposite sides of said piston, a pump, air-conducting means leading from said pump to said air outlet, said piston automatically stopping its operation when the air pressures in said first and last mentioned air conducting means are equal.

11. In a water system of the kind described and in combination, an air motor having a cylinder therein provided with an air inlet and an outlet, a piston reciprocatory in said cylinder, means for conducting air under pressure to said inlet, means for admitting said air from the inlet alternately to opposite sides of said piston, a pump having an air inlet and outlet, and provided with water intake and discharge openings air-conducting means leading from said motor outlet to the pump inlet, and means for automatically stopping the operation of said piston when the discharge of water from said pump is shut off.

12. In a system of the kind described and in combination, an air motor having a cylinder, a piston reciprocatory therein, an outlet communicating with said cylinder, a plurality of inlet valves for controlling the admission of air alternately to the opposite sides of said piston to reciprocate it, means controlled by said piston for adjustably controlling the operation of said air inlet valves, and means for discharging the air driven by said piston through said common outlet.

13. In a system of the kind described and in combination, with a well, a pump having a chamber with an intake communicating with the liquid of said well and an outlet, a valve controlling said intake, a motor having a piston reciprocatory in the cylinder thereof, means for admitting air to said piston to reciprocate it, and a conduit leading from the air outlet of said motor to said pump chamber, whereby the exhaust air driven by said motor enters said chamber, closing said intake valve and forcing the liquid in said chamber through said outlet.

14. In a system of the kind described and in combination with a well, a pump having a chamber with an intake communicating with the liquid of said well and an outlet, a valve controlling said intake, a motor having a piston reciprocatory in the cylinder thereof, means for admitting air to said piston to reciprocate it, a conduit leading from the air outlet of said motor to said pump chamber, whereby the exhaust air driven by said motor enters said chamber, closing said intake valve and forcing the liquid in said chamber through said outlet, and adjustably controlled means intermittently operable for automatically opening said liquid intake valve at each discharge of the liquid in said chamber.

15. In a system of the kind described and in combination with a well, a pump having a chamber with an intake communicating with the liquid of said well and an outlet, a valve controlling said intake, a motor having a piston reciprocatory in the cylinder thereof, an exhaust port in said cylinder, means for admitting air alternately on opposite sides of the piston to reciprocate it, a conduit leading from the air exhaust of said motor to said pump chamber, whereby said exhaust air periodically enters said chamber at each stroke of said piston closing said intake valve and forcing the liquid in said chamber through said outlet, and adjustably controlled means intermittently automatically opening said liquid intake valve of the pump at each discharge of the liquid contents of said chamber.

16. In a water system of the kind described and in combination, a motor, a piston reciprocatory therein, means for alternately driving said piston in opposite directions, a pump having a water chamber therein, a valve controlling the intake to said water chamber, and means independent of said intake valve and controlled by said piston in one direction of its reciprocation for opening said valve and admitting water into said chamber and permitting said valve to automatically close on the opposite stroke of said piston.

17. In a water system of the kind described and in combination, a motor having a main and auxiliary air discharge outlet, a pump having a chamber with a water intake and discharge, and an air inlet and exhaust, valves for said pump inlet, exhaust and water intake, and means controlled by the air admitted through said auxiliary air discharge for the controlling of all said pump valves.

18. In a water system of the kind described and in combination, a motor having a main and an auxiliary air discharge outlet, a pump having a chamber with a water intake and discharge, and an air inlet and exhaust, valves for said pump inlet, exhaust and water intake, means controlled by the air admitted through said auxiliary air discharge for the controlling of all said pump valves, and means for adjusting the timing of said last-mentioned means.

19. In a water system of the kind described and in combination, a motor having a cylinder provided with a main and an auxiliary air outlet, a piston operable in said cylinder, a pump having a main chamber with an air inlet and exhaust, and with a water intake and discharge therein, and an auxiliary chamber, a piston in said auxiliary chamber valves controlling said inlet, exhaust and intake of the pump, said inlet and exhaust valves being operably connected together to act in unison to alternately open said inlet and exhaust, said auxiliary piston being operably connected with and controlling said air exhaust valve, a pipe connecting the pump inlet and the main motor outlet, a pipe leading from the auxiliary motor outlet to said auxiliary pump chamber, a check valve at the auxiliary outlet of said motor operably engageable by said piston at one end of its stroke to permit the air in the motor cylinder to pass therethrough to said auxiliary chamber, to cause the auxiliary piston to operate said exhaust valve.

20. In a device of the kind described and in combination, a motor having a cylinder provided with a main and an auxiliary air outlet, a piston operable in said cylinder, a pump having a chamber with an air inlet and exhaust and with a water intake and discharge therein, valves controlling said inlet, exhaust and intake, said inlet and exhaust valves being operably connected together to act in unison to alternately open said inlet and exhaust, a pipe connecting said pump, inlet and motor outlet, and air-conducting means leading from said cylinder to said pump, a piston operably connected to the discharge valve of said pump and controlled by the air admitted through said last-mentioned air conducting means, a check valve between said cylinder and air-conducting means and operably engageable by said piston at one end of its stroke to permit the air to pass therethrough to said auxiliary piston to operate said discharge valve, means for returning said check valve to its normal position after the piston disengages therefrom and resilient means engaging said auxiliary piston to return it to its normal position to close said discharge valve after said check valve has been returned to its normal position.

21. In a water system of the kind described and in combination, an air motor having a cylinder provided with a main and an auxiliary air outlet, a piston operable in said cylinder, a pump having a main chamber with an air inlet and exhaust and with a water intake and discharge therein, and an auxiliary chamber having an inlet therein, a piston in said auxiliary chamber, valves controlling said pump inlet, exhaust and intake, said inlet and exhaust valves being operably connected together to act in unison to alternately open said inlet and exhaust, said auxiliary piston being operably connected to and controlling said air exhaust valve, a pipe connecting the pump inlet and the main motor outlet, a second pipe leading from the auxiliary motor outlet to the auxiliary chamber and communicating with said auxiliary piston, a check valve at said auxiliary outlet of the motor and operably engageable by said piston at one end of its stroke to permit the air under pressure to pass therethrough to move said auxiliary piston to open said discharge valve and close the air inlet valve of pump, whereby the water intake valve opens to admit water into the main chamber and resilient means for moving said auxiliary piston to its normal position after the air pressure in said auxiliary chamber has been released, whereby the discharge valve is closed and the air inlet valve is opened, and means for varying the duration of the exhaust valve opening.

22. In a water system of the kind described, the combination with an air motor having a cylinder with a main and an auxiliary air outlet, a piston operable in said cylinder and means for admitting air alternately on opposite sides of said piston, a check valve in said auxiliary outlet, said check valve being operable by said piston at substantially the end of the stroke in one direction, of a pump having a chamber with an air inlet and exhaust therein, an intake valve controlling the water intake into said chamber, inlet and exhaust valves rigidly connected together and controlling said pump inlet and exhaust, and means controlled by said check valve for operating said inlet and exhaust valves of the pump in a predetermined manner to control the admission of water to said pump chamber.

23. In a water system of the kind described, the combination with an air motor having a cylinder with a main and an auxiliary air outlet, a piston operable in said cylinder and means for admitting air alternately on opposite sides of said piston, a check valve in said auxiliary outlet, said check valve being operable by said piston at substantially the end of the stroke in one direction, of a pump having a chamber with an air inlet and exhaust therein, an intake valve controlling the water intake into said chamber, inlet and exhaust valves rigidly connected together and controlling said pump inlet and exhaust, means controlled by said check valve for operating said inlet and exhaust valves of the pump to control the admission of water to said pump chamber, in a predetermined manner and means for adjusting the timing of said last mentioned means.

24. In a system of the kind described and in combination, an air motor having a cylinder with air inlets and outlets, a piston movable in said cylinder, a telescopic piston rod connected to said piston, inlet valves controlling said inlets to admit air alternately to opposite sides of said piston, discharge valves controlling the outlets from said cylinder, means for operably connecting said rod and discharge valves for limiting the movement between said last mentioned means and discharge valve, and means engageable with said piston rod to cause said discharge valves to operate with a snap action.

25. In a water system of the kind described and in combination, an air motor having a cylinder therein provided with an inlet and outlet, a piston movable in said cylinder, means for conducting air under pressure to said inlet, a pump, air-conducting means leading from said pump to said air outlet, said piston automatically stopping its operation when the air pressure in said first and last mentioned air conducting means are equal.

In testimony whereof we have hereunto signed our names in the presence of two subscribing witnesses.

FORREST BENNER.
OTTO W. PFAU.
RICHARD O. JISCHKOWSKI.

Witnesses:
  Roy W. Hill,
  Ruth M. Ephraim.